(12) United States Patent
Harpin et al.

(10) Patent No.: US 11,752,890 B2
(45) Date of Patent: Sep. 12, 2023

(54) APPARATUS, SYSTEMS, AND METHODS FOR CHARGING PERSONAL MOBILITY VEHICLES VIA DOCKS

(71) Applicant: Lyft, Inc., San Francisco, CA (US)

(72) Inventors: Yannik Harpin, Montreal, CA (US); Alexander Timothy Dixon, San Anselmo, CA (US); Marie-Pierre Gendron, Mercier (CA); Carl Germain, Quebec (CA); Rochus Emanuel Jacob, San Francisco, CA (US); Kelly Erin Johnson, Oakland, CA (US); Carlos Henrique Petzl Lorenz, Montreal, CA (US); Nicholaus Ian Lubinski, Fairfax, CA (US); Timothy Rex Martin, San Francisco, CA (US); Christopher Paul Merrill, San Francisco, CA (US); Cyril Francis Meyer, III, San Francisco, CA (US); Jacqueline Tandler, San Francisco, CA (US); Griffin Samuel Valentine Thomson, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 741 days.

(21) Appl. No.: 16/457,795

(22) Filed: Jun. 28, 2019

(65) Prior Publication Data
US 2020/0406772 A1    Dec. 31, 2020

(51) Int. Cl.
*B60L 53/31*    (2019.01)
*B60L 53/16*    (2019.01)
*B60L 53/68*    (2019.01)

(52) U.S. Cl.
CPC .............. *B60L 53/31* (2019.02); *B60L 53/16* (2019.02); *B60L 53/68* (2019.02);
(Continued)

(58) Field of Classification Search
CPC .......... B60L 53/31; B60L 53/16; B60L 53/68; B60L 2200/14; B60L 2200/24
See application file for complete search history.

(56) References Cited

U.S. PATENT DOCUMENTS 8,061,499 B2 * 11/2011  Khairallah .............. G07F 17/10
                                                          340/432
2011/0181240 A1 * 7/2011  Baarman ................. B60L 53/36
                                                          320/108
(Continued)

OTHER PUBLICATIONS

"Swiftmile Autonomous Charging Platform", URL: https://swiftmile.com/, Swiftmile, retrieved on Jul. 17, 2019, 1 page.
(Continued)

*Primary Examiner* — David V Henze-Gongola
(74) *Attorney, Agent, or Firm* — Baker Botts L.L.P.

(57) ABSTRACT

The disclosed apparatus may include a collar for charging a personal mobility vehicle via a dock. In some embodiments, the collar may be fitted with a charging connector that interfaces with a dock that charges the personal mobility vehicle when the personal mobility vehicle is docked. In one embodiment, the collar and a corresponding receiving element in the dock may be shaped such that the collar fits securely in the receiving element without requiring mechanical action by the collar or receiving element and only requiring a user to push the personal mobility vehicle straight into the dock. Various other methods, systems, and computer-readable media are also disclosed.

19 Claims, 14 Drawing Sheets

(52) U.S. Cl.
CPC ....... *B60L 2200/12* (2013.01); *B60L 2200/24* (2013.01); *B60L 2270/36* (2013.01)

(56) References Cited

U.S. PATENT DOCUMENTS

2018/0001776 A1* 1/2018 Kim ..................... G07F 15/005
2020/0031247 A1* 1/2020 Moravick ............. H02J 7/0027

OTHER PUBLICATIONS

"JUMP—Electric Bikes & Electric Scooters Available for Rent Globally", URL: https://jump.com/, Uber, retrieved on Jul. 17, 2019, pp. 1-16.

* cited by examiner

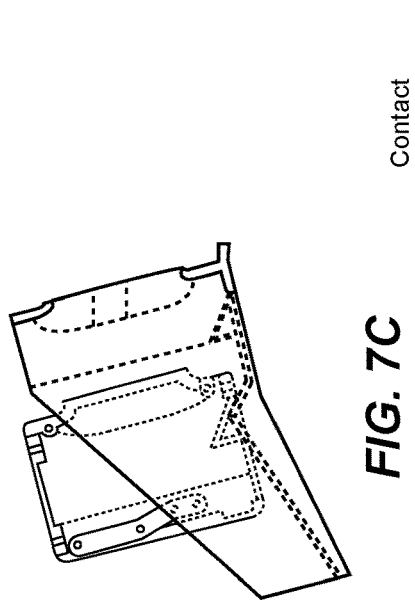
FIG. 7C
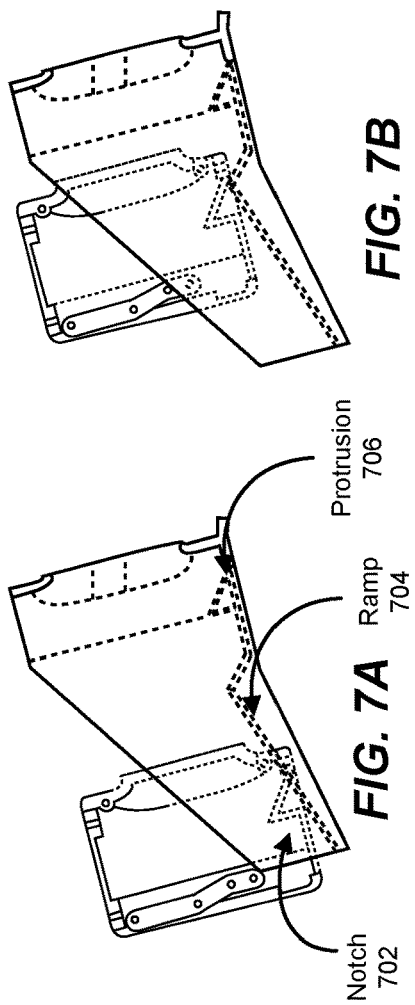
FIG. 7B
FIG. 7A
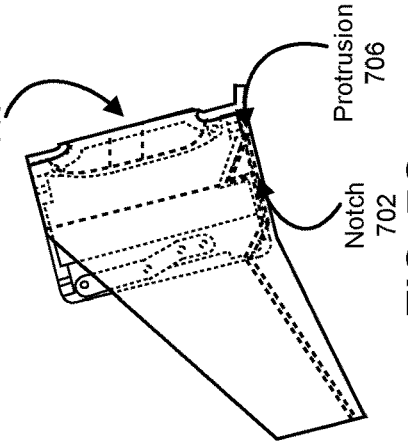
FIG. 7G
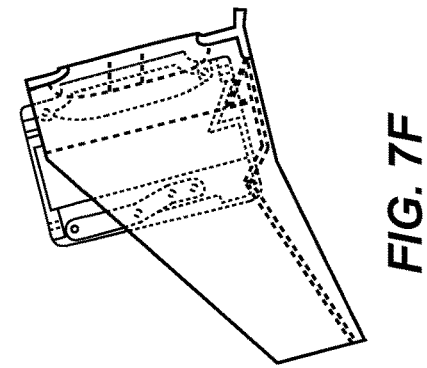
FIG. 7F
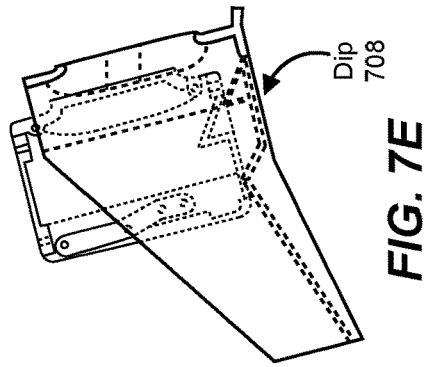
FIG. 7E
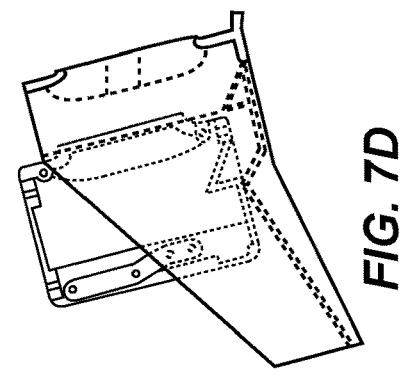
FIG. 7D

APPARATUS, SYSTEMS, AND METHODS FOR CHARGING PERSONAL MOBILITY VEHICLES VIA DOCKS

BACKGROUND

Transportation services may provide transportation on demand, drawing from a transportation supply pool that includes vehicles of multiple types to meet the needs of those requesting transportation as such needs arise. Some transportation services may include personal mobility vehicles such as bicycles and scooters in a dynamic transportation network in order to enable transportation requestors to complete portions of a journey more efficiently. In some embodiments, a dynamic transportation network may include personal mobility vehicles with electrical components, such as electric bicycles and/or electric scooters.

In some cases, a personal mobility vehicle may periodically be temporarily taken out of service for recharging and/or maintenance, during which time the personal mobility vehicle is not fulfilling transportation requests. Extending the operation time of a personal mobility vehicle before the personal mobility vehicle requires charging may improve the overall efficiency of the dynamic transportation network. Additionally, reducing the time that personal mobility vehicles spend out of service for charging may improve the availability of such vehicles and thus the user experience of transportation requestors seeking conveniently accessible personal mobility vehicles to fulfill their transportation requests. Accordingly, the instant disclosure identifies and addresses a need for additional and improved systems and methods for charging personal mobility vehicles.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 7A-7G illustrate the process of a charging collar securely interfacing with a dock.

Figure 1:
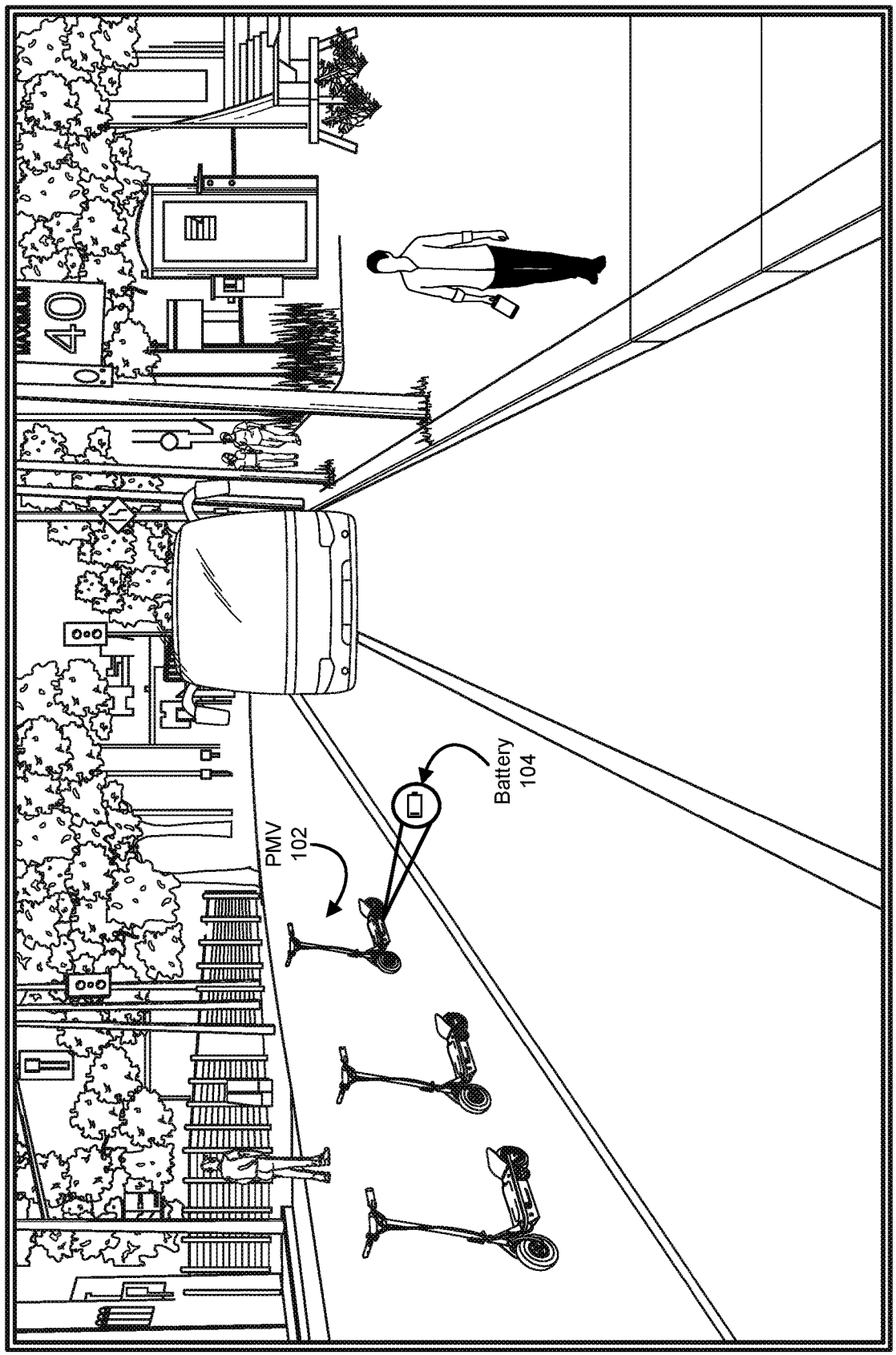
FIG. 1 is an illustration of a personal mobility vehicle in context.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to an apparatus for charging personal mobility vehicles. In some embodiments, the apparatus may include a collar fitted with a charging connector (e.g., connection pads) that interfaces with a dock that charges the personal mobility vehicle when the personal mobility vehicle is docked. In one embodiment, the collar and a corresponding receiving element in the dock may be shaped such that the collar fits securely in the receiving element without requiring mechanical action by the collar or receiving element and only requiring a user to push the personal mobility vehicle straight into the dock. For example, the receiving element may include a ramp shape and a mating shape. In some embodiments, the collar may have a corresponding notch dimensioned to cause the collar to slide up the ramp as personal mobility vehicle is pushed toward the dock and dimensioned to mate with the mating shape (e.g., by falling from the end of the ramp onto the mating shape), thereby providing stability to the personal mobility vehicle within the dock while facilitating a secure charging connection. In some examples, disengaging the collar from the receiving element may involve lifting the front of the personal mobility vehicle a small distance such that the notch in the collar disengages from the mating shape in the receiving element and rises above the ramp shape, allowing removal of the personal mobility vehicle from the dock. By enabling the personal mobility vehicle to be docked with a simple pushing action and/or removed from the dock with a simple pulling action, the systems described herein may simplify the user experience of docking and/or removing a personal mobility vehicle, improving the user experience and increasing the probability that the dock will be correctly used by the user. By enabling personal mobility vehicles to charge at a dock in an accessible location rather than at a service center, the systems described herein may improve the efficiency of a dynamic transportation network and/or the availability of personal mobility vehicles to the dynamic transportation network. Additionally, by providing docks for personal mobility vehicles, the systems described herein may reduce clutter in public areas, make personal mobility vehicles easier to locate for users, and/or reduce theft and/or vandalism of personal mobility vehicles.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include personal mobility vehicles that are not bound to traditional road lanes, such as scooters, bicycles, electric scooters, electric bicycles, and/or any other suitable type of personal mobility vehicle.

FIG. 1 illustrates an example personal mobility vehicle in context. In some embodiments, a personal mobility vehicle (PMV) such as a PMV 102 may be partially or entirely powered by a battery such as battery 104. The term "battery," as used herein, generally refers to any component capable of storing electrical charge. In some embodiments, a PMV may include one or more electrical components including a battery, a motor (e.g., that drives and/or provides assistive power to one or more wheels of the PMV), and/or a communication module (e.g., that communicates with a dynamic transportation matching system). In some examples, when battery 104 is low on charge, PMV 102 may not be available to transportation requestors and/or may need to be relocated to a service center for charging. Additionally, in some examples, PMV 102 and/or additional PMVs may be left by transportation requestors in arbitrary locations in public spaces, such as scattered across a sidewalk, increasing the risk of damage to PMV 102.

Figure 2:
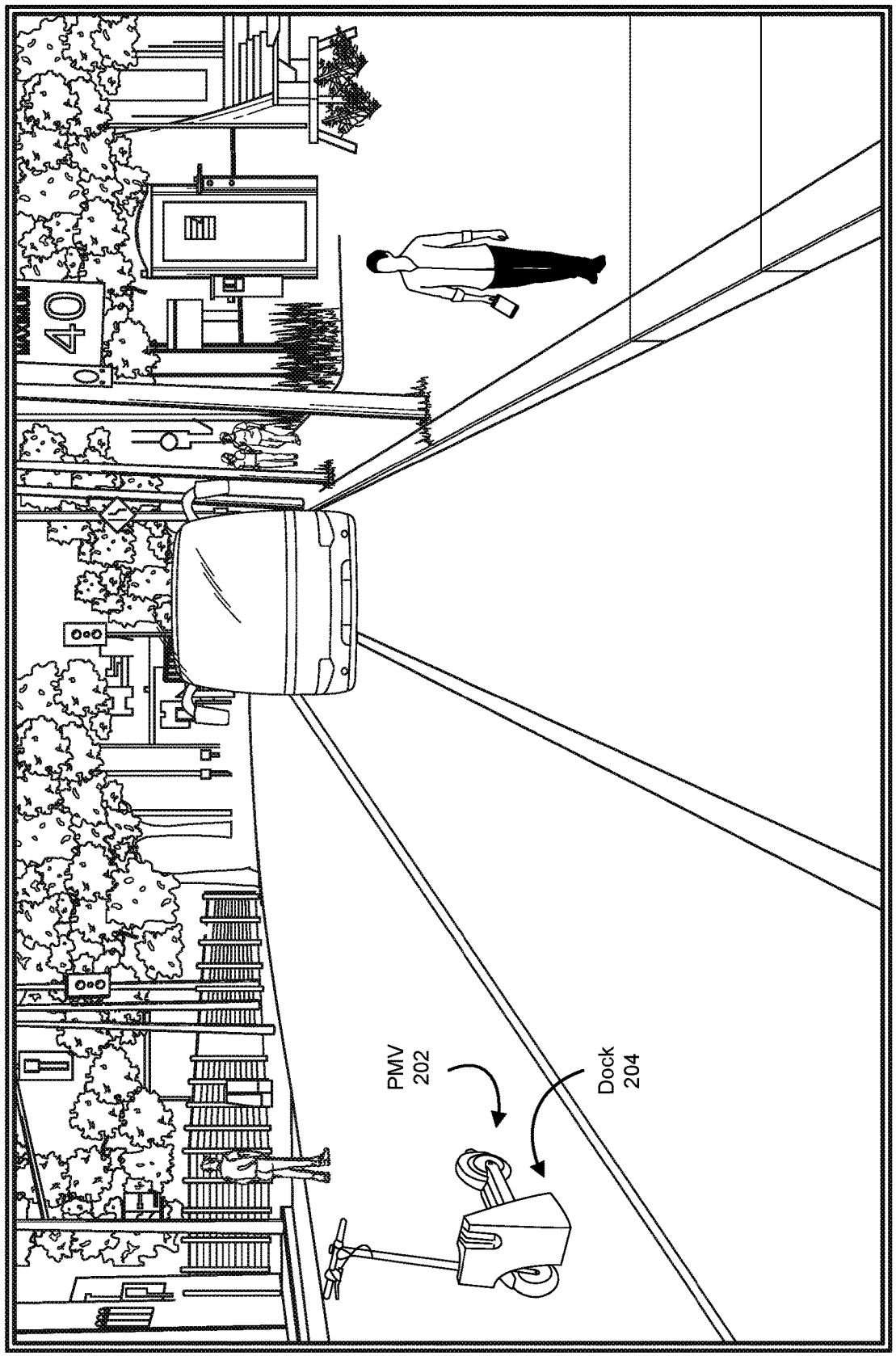
FIG. 2 is an illustration of a personal mobility vehicle docked at a charging dock in context.

FIG. 2 illustrates a PMV docked at a charging dock in context. The term "dock," as used herein, generally refers to any structure that dimensioned for interfacing with one or more types of PMV. For example, a dock may provide a place for transportation requestors to locate and take a PMV for transport and/or a place for transportation requestors to deposit and/or return a PMV after usage. In some embodiments, a dock may be fixed in place. For example, a dock may be bolted to concrete. In some embodiments, a dock may include one or more charging components that is capable of providing electrical charge to a battery within a PMV. In some examples, a dock may be dimensioned to interface with a single PMV at a time. Additionally or alternatively, a dock may be dimensioned to interface with multiple PMVs at one time. In some embodiments, a dock may be dimensioned to interface with a single type of PMV, such as an electric scooter. Additionally or alternatively, a dock may be dimensioned to interface with multiple types of PMVs, such as both electric and non-electric scooters and/or both scooters and bicycles. In some embodiments, a dock may be dimensioned to interface only with PMVs fitted with a certain docking component, such as a charging collar. In one embodiment, a dock may include a locking component that prevents the removal of the PMV from the dock when the lock component is engaged. In some embodiments, a dock may include a communication module that communicates with a server (e.g., of a dynamic transportation matching system). As illustrated in FIG. 2, in some examples, a PMV 202 may be docked at a dock 204 via a charging collar affixed to PMV 202. By charging via dock 204, PMV 202 may spend less time unavailable to transportation requestors, improving the availability of PMV 202 and/or the efficiency of a dynamic transportation network with which PMV 202 is associated. In addition, being securely interfaced with dock 204 may prevent PMV 202 from being damaged and/or make PMV 202 easier for a transportation requestor to locate due to being docked at a known and/or obvious location.

Figure 3A:
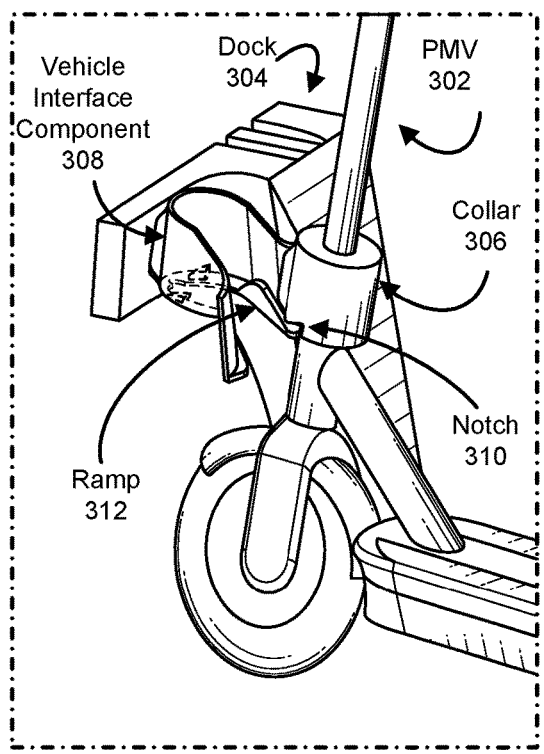
FIGS. 3A, 3B, and 3C illustrate a gravity-based interaction between a personal mobility vehicle and a dock.
Figure 3B:
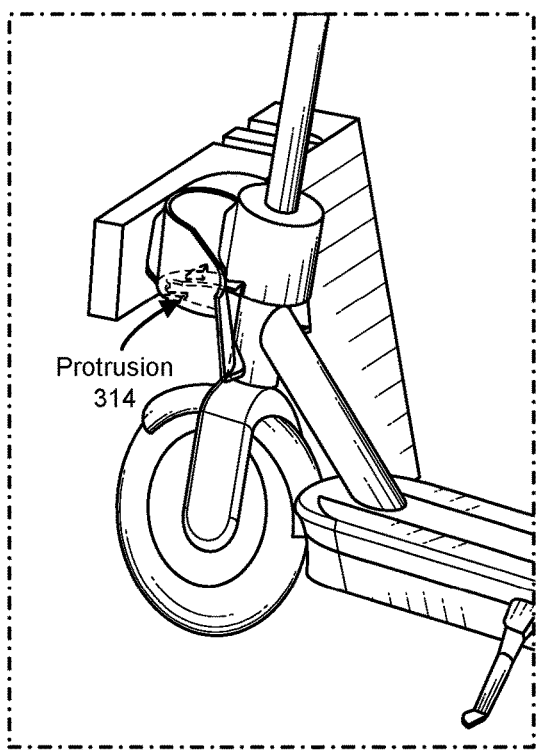
Figure 3C:
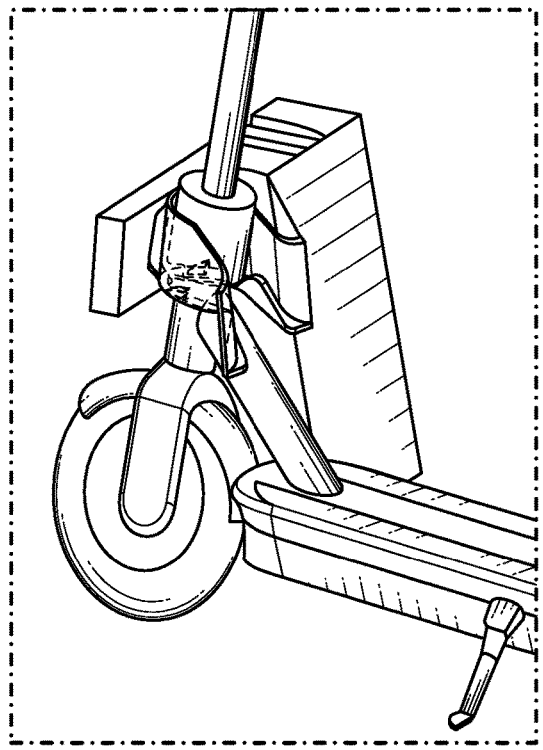

FIGS. 3A, 3B, and 3C illustrate an example gravity-based interaction between a PMV 302 with a collar 306 and a dock 304 with a vehicle interface component 308. In one example, as shown in FIG. 3A, a user may push PMV 302 towards dock 304 such that collar 306 is aligned with vehicle interface component 308. In some embodiments, vehicle interface component 308 may be designed to guide collar 306 up a ramp 312 even if PMV 302 does not approach vehicle interface component 308 from a directly perpendicular angle. In some examples, as shown in FIG. 3B, collar 306 may enter vehicle interface component 308, gliding up ramp 312, such that a notch 310 in the bottom of collar 306 approaches a protrusion 314 in vehicle interface component 308. In one embodiment, the front wheel of PMV 302 may lift off the ground as collar 306 ascends ramp 312. In some embodiments, notch 310 may represent any type of concavity within collar 306. In some examples, as shown in FIG. 3C, when PMV 302 is fully docked at dock 304, collar 306 may reach the end of ramp 312 and drop into a divot, enabling protrusion 314 to mate with notch 310 and thereby producing a gravity-based interaction that secures collar 306 to vehicle interface component 308. In one embodiment, when collar 306 is securely interfaced with vehicle interface component 308, a charge-receiving component of collar 306 may be in contact with a charge-providing component of vehicle interface component 308, enabling PMV 302 to receive charge from dock 304. In one embodiment, the front wheel of PMV 302 may be off the ground while PMV 302 is docked in dock 304.

Figure 4:
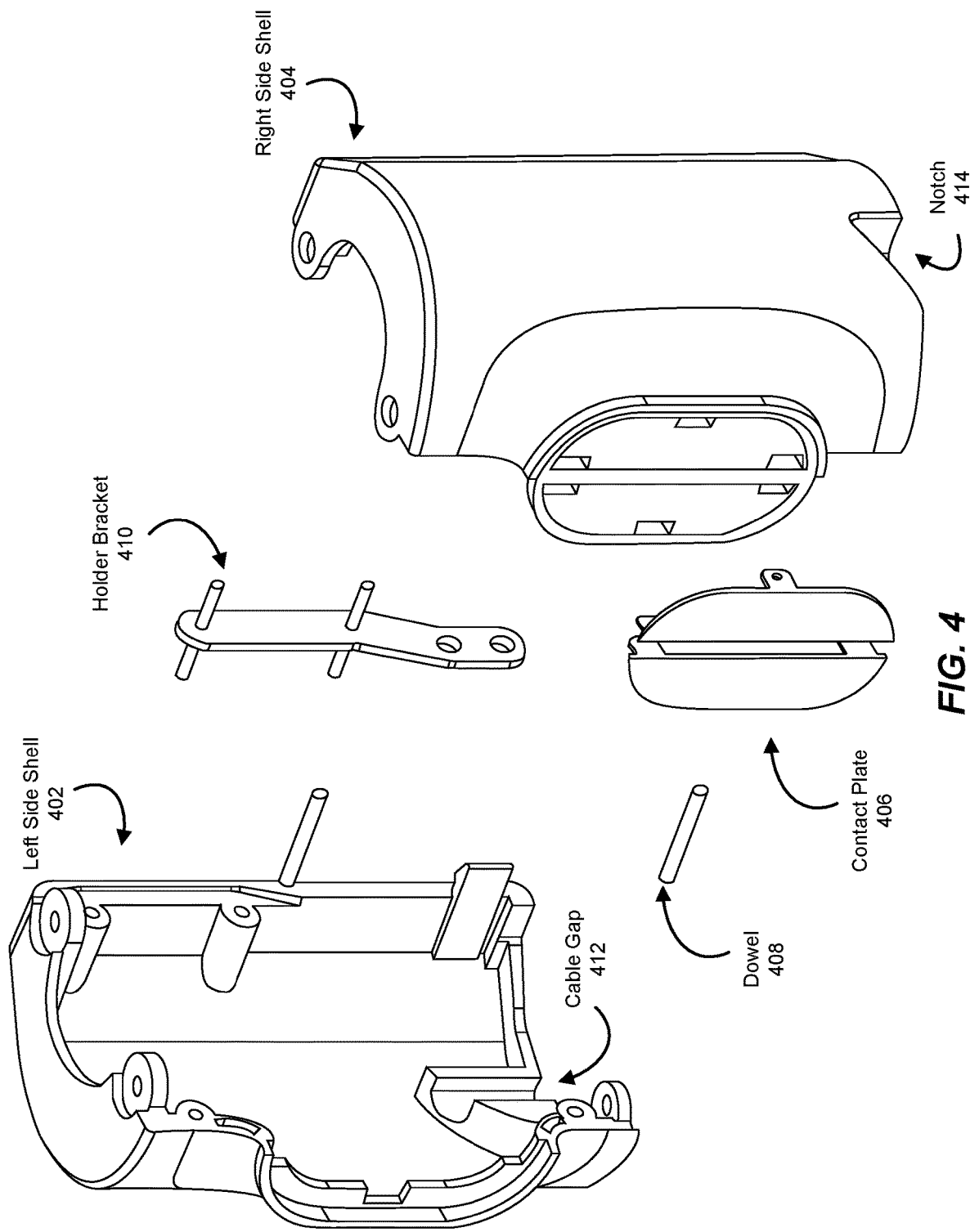
FIG. 4 is an illustration of an exploded view of a charging collar.

FIG. 4 illustrates an exploded view of a charging collar. As illustrated in FIG. 4, in some embodiments, a charging collar may include a left side shell 402 that is coupled to a right-side shell 404 and/or to a PMV via a holder bracket 410 and/or a dowel 408. In some embodiments, left-side shell 402 and right-side shell 404 may together form a mount component that is mountable to a structural component of a PMV. The term "structural component," as used herein, generally refers to any component of a PMV that does not move relative to the majority of the rest of the PMV when the PMV is in motion (as opposed to, e.g., an axle or wheel). For example, a structural component of a PMV may include a handlebar stem, a handlebar, a fork, and/or a body. The phrase "mountable to," as used herein, may describe a component that is designed and/or produced with specifications that ensure the component can be physically affixed (i.e., mounted) to predetermined additional component and/or set of components. In some embodiments, a component may be mounted to an additional component via one or more screws and/or brackets. Additionally or alternatively, a component may be mounted to an additional component via an adhesive. In some embodiments, a component may be mounted to an additional component via interlocking shapes of both components. In one embodiment, bracket 410 may prevent vertical motion of the collar relative to the PMV component to which the collar is affixed (e.g., by affixing the collar securely in place on the component).

In some embodiments, left side shell 402 and/or right side shell 404 may include a cable gap 412 that is dimensioned to allow a cable component of the PMV (such as a brake cable) to pass through the charging collar. In one embodiment, a charging collar may include a contact plate 406 made of brass and/or some other suitable material that, when the charging collar is securely interfaced with a dock, receive electrical charge from the dock. Additionally or alternatively, a charging collar may include another means of receiving charge including but not limited to one or more pins. In some embodiments, left-side shell 402 and/or right-side shell 404 may include a notch 414 that enables the charging collar to securely interface with a dock. In some embodiments, notch 414 may be wedge-shaped. In some embodiments, notch 414 may form some or all of a dock interface component that is adapted to securely interface with a dock via a gravity-based interaction between the dock interface component and the dock. In some embodiments, the dock interface component may also include the bottom surface of left-side shell 402 and/or right-side shell 404. The term "adapted to," as used herein, may generally describe any component that is designed, produced, constructed, assembled, and/or configured to perform a specified task, such as interfacing with a specified additional component.

The term "securely interface," as used herein, may generally refer to an interaction that results in a PMV being connected to a dock such that the PMV is unlikely to become disconnected and/or removed from the dock without intentional movement on the part of a user to disconnect and/or remove the PMV. In some examples, a PMV may securely interface with a dock such that a user must lift and/or pull back the PMV to disconnect and/or remove the PMV from the dock. The term "gravity-based interaction," as used herein, generally refers to any interaction between components where fixed-position components are brought together by gravity rather than by the mechanical action of one or more moving components. In one embodiment, a gravity-based interaction may include a secure temporary physical connection between a dock interface component of a charging collar and a dock. In some examples, a gravity-based interaction may occur when the dock interface component is moved towards the dock with a given amount of momentum. In one embodiment, once physical contact is made between the component and the dock, the momentum may cause the dock interface component to elevate up a ramp of the dock until the dock interface component reaches a given elevation point on the ramp that causes the dock interface to drop by a gravitational force such that the dock interface component connects with the dock, establishing a secure interface between the dock interface component and the dock. In some embodiments, a dock dimensioned to securely interface with a charging collar may include a protrusion that mates with notch 414 in a gravity-based interaction. In one embodiment, a top edge of left-side shell 402 and/or right-side shell 404 may be shaped to be at an angle to the ground when the charging collar is affixed to a PMV that is in an upright position. In some examples, angling the top of the charging collar may prevent users from putting weight onto the top of the collar and risking damage to the collar.

Figure 5:
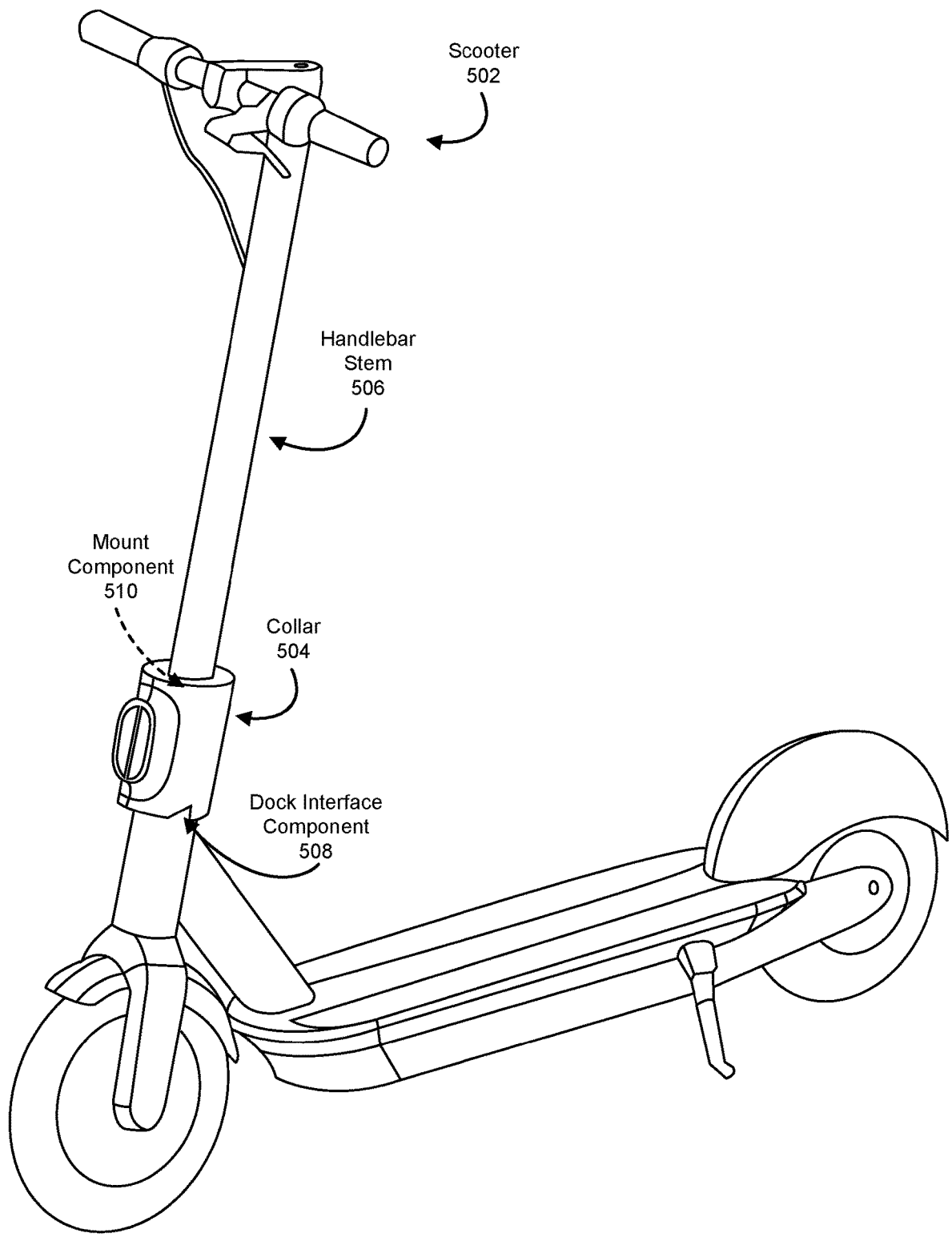
FIG. 5 is an illustration of a charging collar affixed to a personal mobility vehicle.

FIG. 5 illustrates a charging collar affixed to a scooter. As illustrated in FIG. 5, in some embodiments, a collar 504 may be affixed to a handlebar stem 506 of a scooter 502. In some embodiments, collar 504 may be affixed to the base of handlebar stem 506. Additionally or alternatively, collar 504 may be affixed to a different portion of handlebar stem 506 and/or to a different component of scooter 502. In some embodiments, one or more cables that run along handlebar stem 506, such as a brake cable, may pass through collar 504. In one embodiment, collar 504 may be affixed to handlebar stem 506 such that a charge-receiving component of collar 504 (e.g., a contact plate) is oriented towards the front of scooter 502. In some embodiments, scooter 502 may be an electric scooter and collar 504 may receive charge from a dock and provide that charge to one or more batteries within scooter 502. In some examples, collar 504 may be affixed to handlebar stem 506 such that a dock interface component 508 (e.g., notch 414 illustrated in FIG. 4) is oriented to the base of collar 504 and/or is, when scooter 502 is upright, at an appropriate height for interfacing with a dock. In some embodiments, a mount component 510 of collar 504 (e.g., holder bracket 410 illustrated in FIG. 4) may not be externally visible when collar 504 is affixed to scooter 502. In some embodiments, the term "mount component" may describe a portion of the collar that also includes the dock interface component. For example, in one embodiment, mount component 510 may encompass the entire visible portion of the collar and/or a hidden bracket and dock interface component 508 may describe a notch within mount component 510. In one embodiment, collar 504 may include one or more pads that are adapted to make contact with a ball-shaped contact on the dock.

Figure 6:
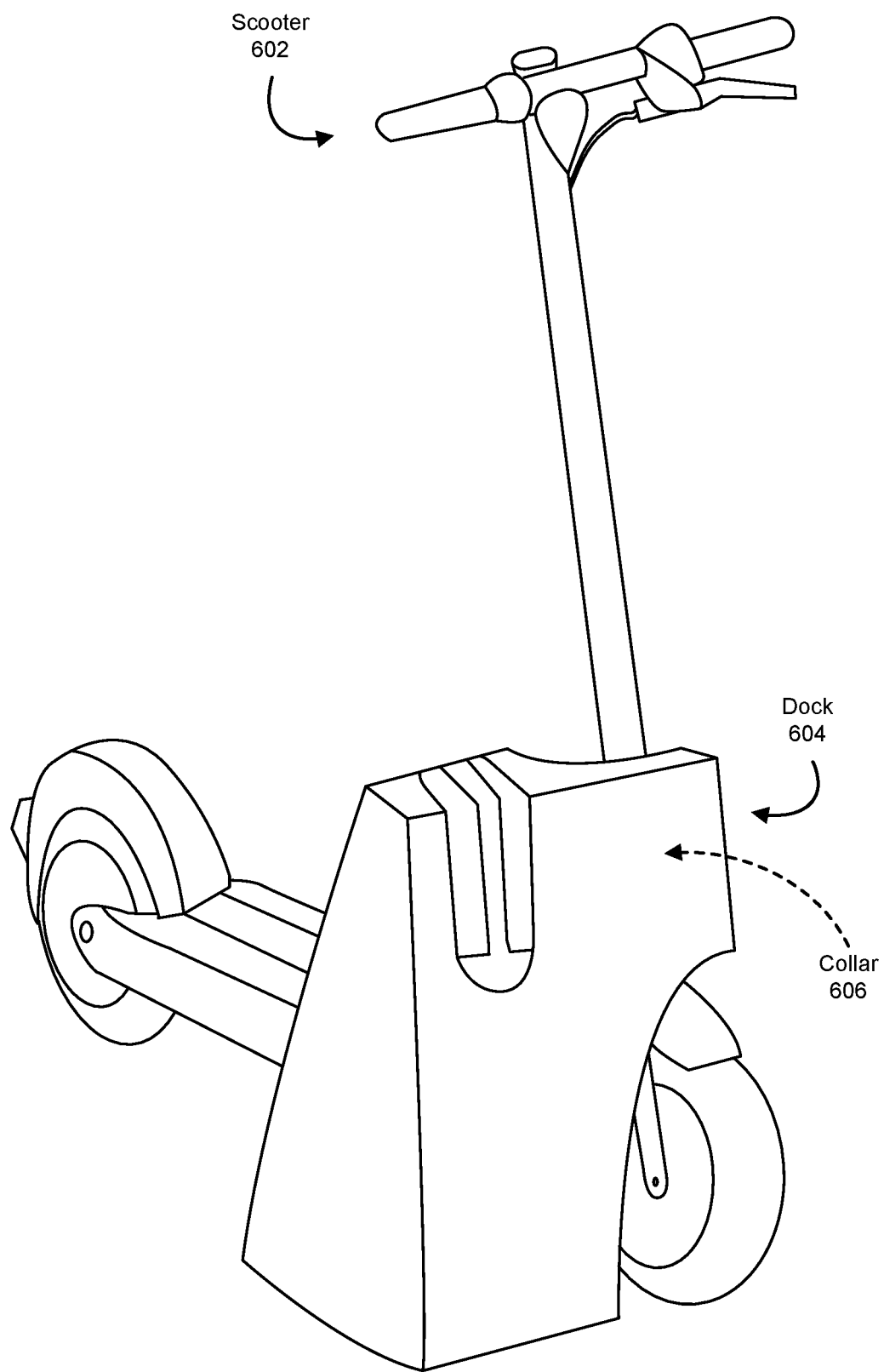
FIG. 6 is an illustration of a personal mobility vehicle with a charging collar securely interfaced with a dock.

FIG. 6 illustrates a scooter with a charging collar securely interfaced with a dock. As illustrated in FIG. 6, in some examples, a scooter 602 may be securely interfaced with a dock 604 via a collar 606 (not shown). In one embodiment, dock 604 may be dimensioned to interface with a single scooter at a time. Additionally or alternatively, dock 604 may be dimensioned to interface with multiples scooters at a time. In some embodiments, scooter 602 may be docked by pushing scooter 602 directly forward into dock 604. Additionally or alternatively, scooter 602 may be docked by pushing scooter 602 into dock 604 and then rotating the handlebars of scooter 602 (e.g., by a predetermined amount in a clockwise or counterclockwise direction). In some embodiments, dock 604 may include angled components that guide scooter 602 into dock 604 at the correct angle to securely interface with dock 604. In some embodiments, the collar may remain in the same static arrangement when securely interfaced with the dock and when not interfaced with the dock (i.e., the collar may not include moving parts). In some embodiments, one or more electrical components of scooter 602 (e.g., the battery) may receive charge via an electrical component of collar 606 receiving charge from a power providing component of dock 604 when scooter 602 is securely interfaced with dock 604. In one embodiment, dock 604 may be connected to an external power source, such as solar panels and/or a connection to an electrical grid (e.g., a power outlet). Additionally or alternatively, dock 604 may contain an internal power source, such as a battery. In some embodiments, any docked PMV that is not at full charge may receive charge from the dock. In some embodiments, the dock may verify that the PMV is authorized to receive charge from the dock. In one embodiment, a dock may only distribute charge to PMVs under certain circumstances, such as if the PMV is below a certain level of charge, if the dock is above a certain level of charge (e.g., if the dock is operating off of a battery), if the PMV has already been docked for a certain length of time, if the PMV is expected to be docked for a certain length of time, if the current time is within a designated time window for charging (e.g., night), and/or if the PMV is locked to the dock.

FIGS. 7A-7G illustrate the process of a charging collar securely interfacing with a dock. As illustrated in FIG. 7A, as a PMV equipped with a charging collar is pushed into a dock, the charging collar may move up a ramp 704, bringing a notch 702 within the charging collar towards a protrusion 706 of the dock. As illustrated in FIGS. 7B, 7C, and 7D, as the PMV is pushed towards the dock, the collar may continue ascending ramp 704. In some embodiments, the front of the PMV may be lifted by the progress of the collar up ramp 704. In one embodiment, as illustrated in FIGS. 7E and 7F, the dock may have a dip 708 at the end of ramp 704 into which the docking collar may be pulled by gravity as the docking collar is pushed past the end of ramp 704. In some embodiments, as illustrated in FIG. 7G, notch 702 may mate with protrusion 706 while the docking collar rests in dip 708, securely interfacing the docking collar with the dock. In some embodiments, while the docking collar is securely interfaced with the dock, a contact plate 710 and/or other charge-receiving component of the charging collar may interface with a charge-providing component of the dock. In some embodiments, to remove the PMV equipped with the charging collar from the dock, the process may be reversed. In one embodiment, a user may remove the PMV from the dock by pulling the PMV backwards from the dock. Additionally or alternatively, a user may remove the PMV from the dock by lifting the PMV slightly so that the collar exits dip 708 and/or clears the end of ramp 704 and then pulling the PMV backwards from the dock. In one embodiment, dip 708 may include a slope adjoining ramp 704 such that pulling the PMV backwards results in the front of the PMV being lifted as the collar moves from dip 708 into ramp 704 without the user manually lifting the front of the PMV to disengage the collar from the dock. In one embodiment, a front wheel of the PMV may be raised out of contact with the ground when a collar affixed to the PMV is securely interfaced with a dock.

Figure 8:
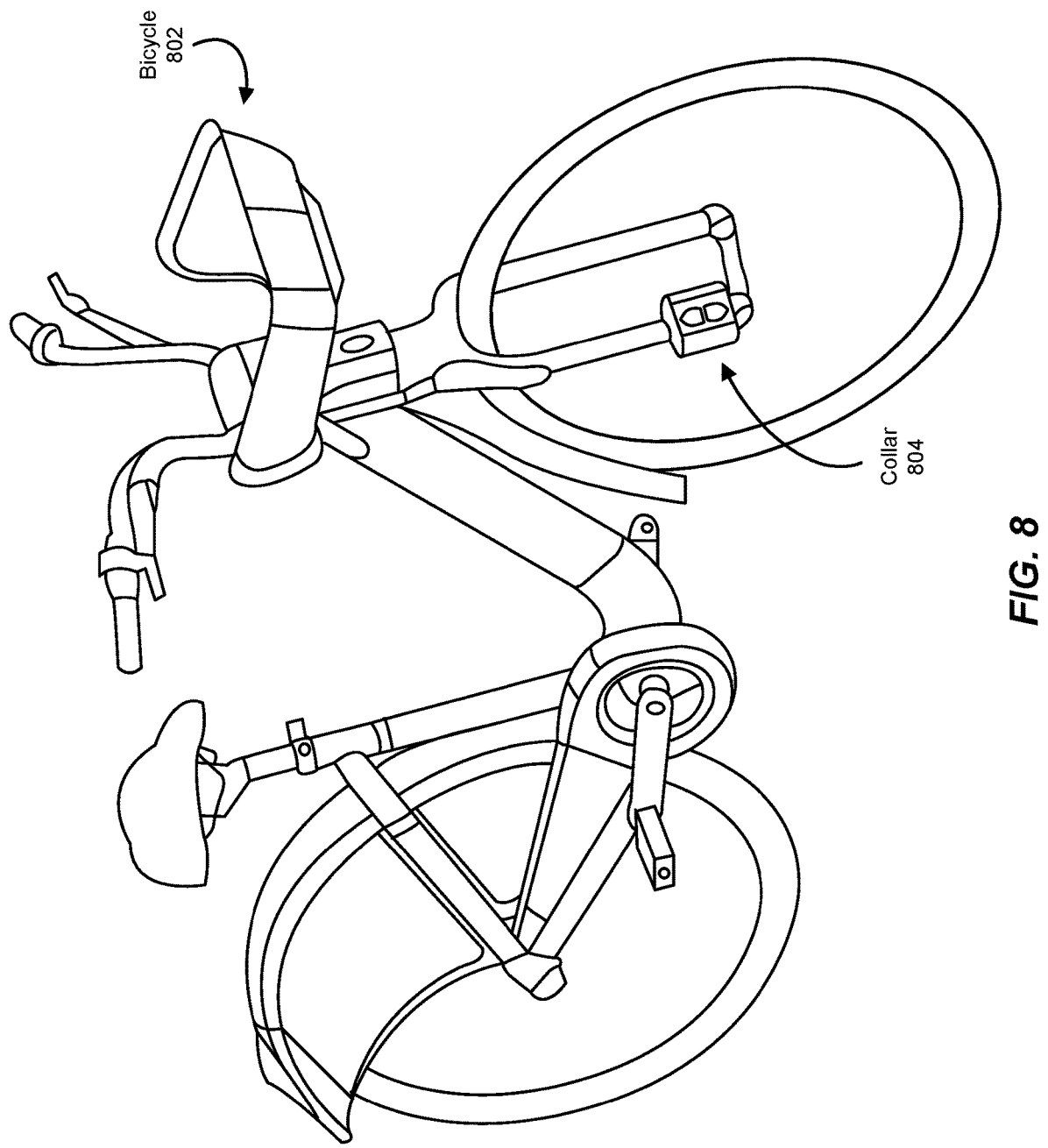
FIG. 8 is an illustration of a charging collar on an additional type of personal mobility vehicle.

FIG. 8 illustrates a charging collar on an additional type of PMV. In some embodiments, a collar 804 may be affixed to a non-scooter PMV, such as a bicycle 802. In one embodiment, collar 804 may be affixed to a front fork of bicycle 802. Additionally or alternatively, collar 804 may be affixed to a different component of bicycle 802. In some embodiments, collar 804 may be affixed to bicycle 802 such that a charge-receiving component of collar 804 faces towards the front of bicycle 802. In some embodiments, the same general configuration of collar (e.g., as illustrated in FIG. 4) may be affixed to multiple types of PMVs, such as both a scooter and a bicycle.

Figure 9:
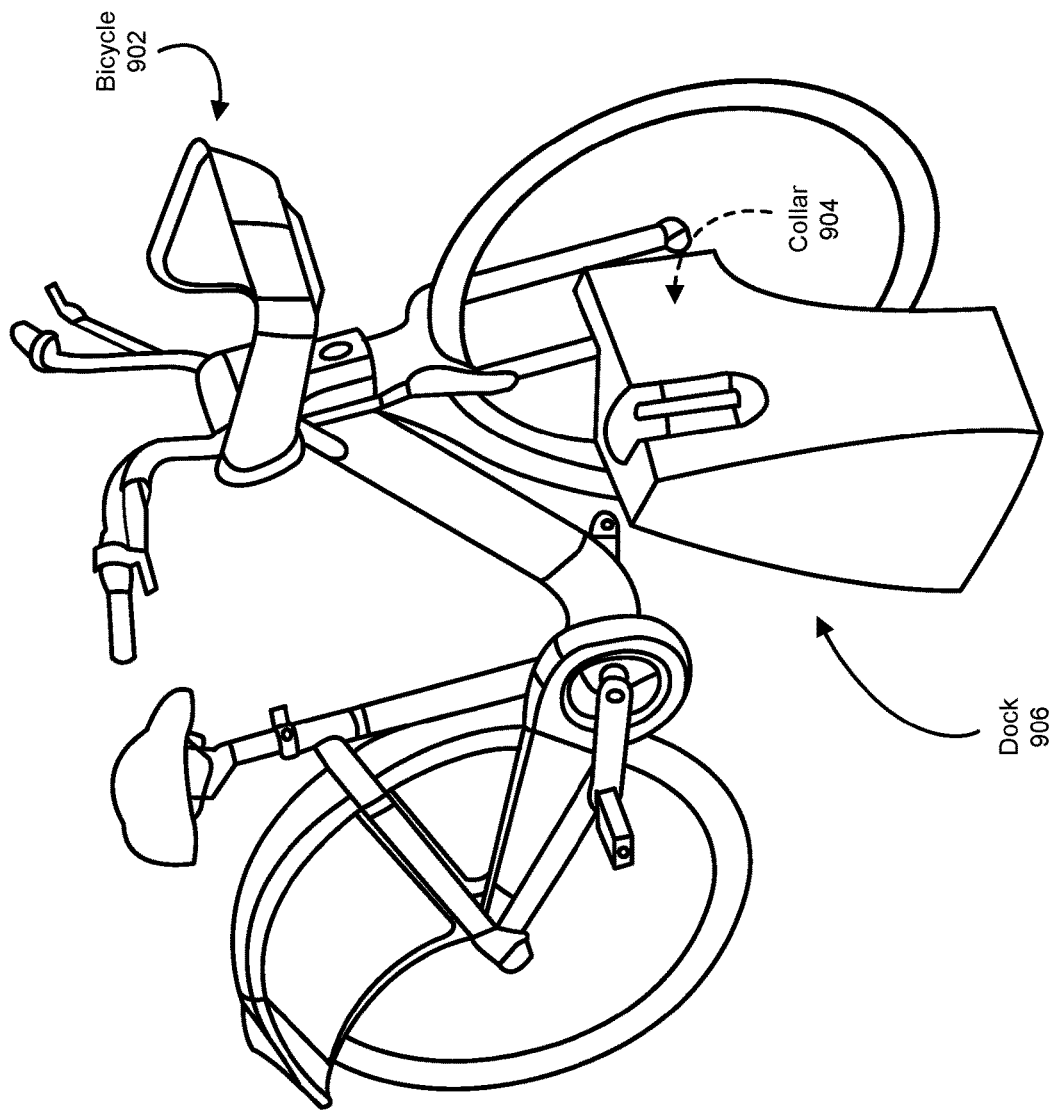
FIG. 9 is an illustration of an additional type of personal mobility vehicle with a charging collar securely interfaced with a dock.

FIG. 9 illustrates an additional type of PMV with a charging collar securely interfaced with a dock. In some examples, a bicycle 902 equipped with a collar 904 (not shown) may securely interface with a dock 906. In one embodiment, dock 906 may be dimensioned to securely interface with collars affixed to multiple types of PMVs. For example, dock 906 may dimensioned to securely interface with a collar attached to bicycle 902 and/or a collar attached to a scooter. In some embodiments, a charging component and/or power providing component of dock 906 may provide charge to a charge-receiving component of collar 904 that may then provide charge to one or more batteries within bicycle 902. In some embodiments, a user may securely interface bicycle 902 with dock 906 by pushing bicycle 902 forward into dock 906 (i.e., as illustrated in FIG. 7).

Figure 10:
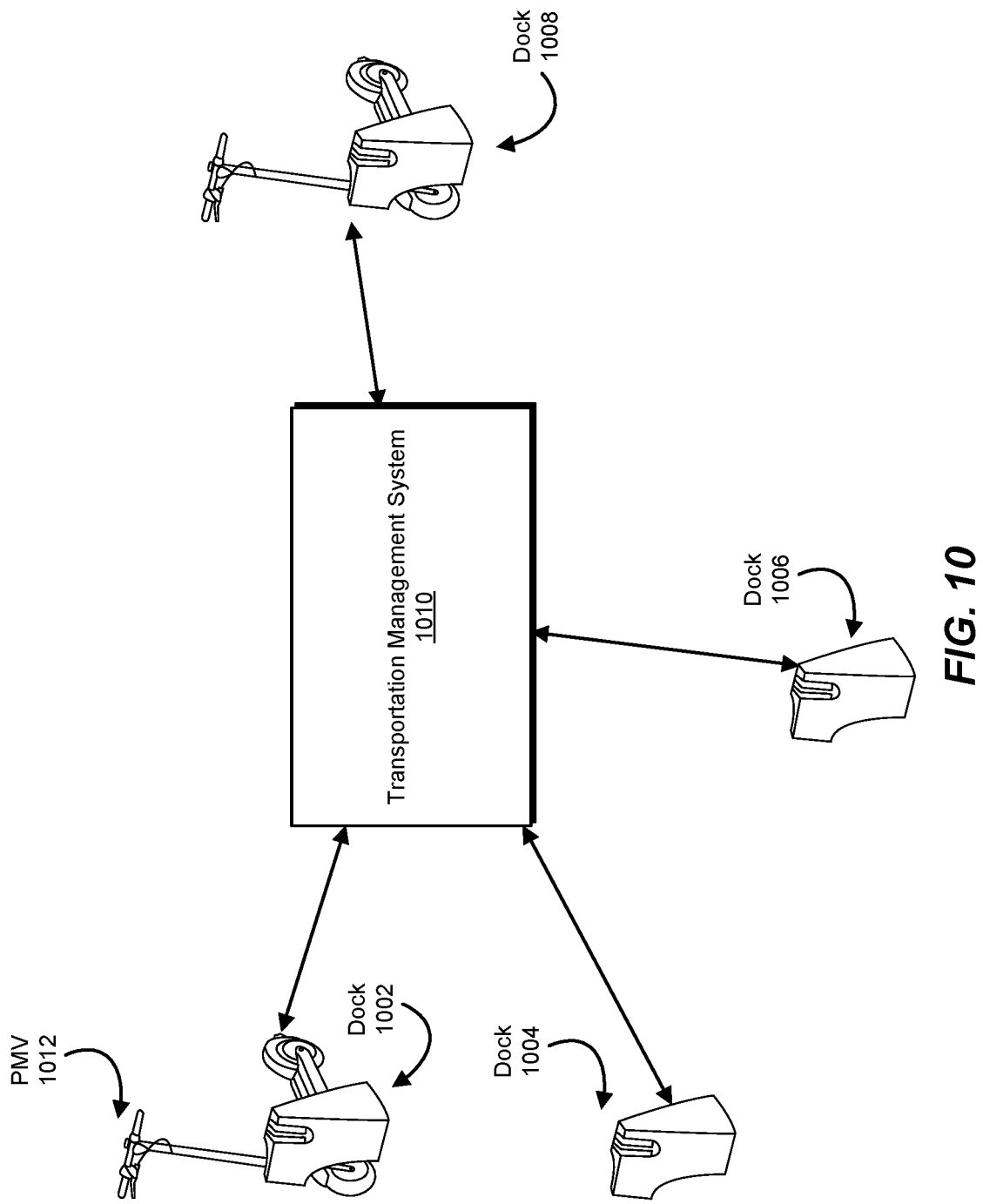
FIG. 10 is a diagram of an example transportation management system interacting with docks.

FIG. 10 is a diagram of an example transportation management system interacting with docks. As illustrated in FIG. 10, a transportation management system 1010 may communicate with one or more docks. In some embodiments, transportation management system 1010 may be part of a dynamic transportation matching system. In one example, transportation management system 1010 may communicate with docks 1002, 1004, 1006, and/or 1008. In some embodiments, transportation management system 1010 may receive PMV status information from various docks. For example, dock 1002 may communicate that PMV 1012 is currently docked with dock 1002. In some examples, dock 1002 may communicate a type of PMV 1012, a battery status of PMV 1012, and/or other status information about PMV 1012 (e.g., current mileage, time since last maintenance, time until next maintenance, conditions, etc.). In some examples, docks not currently occupied by PMVs may communicate that information to transportation management system 1010. For example, dock 1004 may periodically send messages indicating that dock 1004 is not currently occupied by a PMV. In some embodiments, dock may send status messages to transportation management system 1010 at regular intervals (e.g., every minute, every ten minutes, and/or every hour). Additionally or alternatively, transportation management system 1010 may send queries to docks at regular intervals. In some embodiments, a dock may message transportation management system 1010 whenever a PMV is docked and/or removed from the dock. In one embodiment, transportation management system 1010 may send instructions to docks, such as whether or not to charge a particular docked PMV, whether to lock a PMV to the dock, and/or whether to unlock a PMV from the dock.

Figure 11:
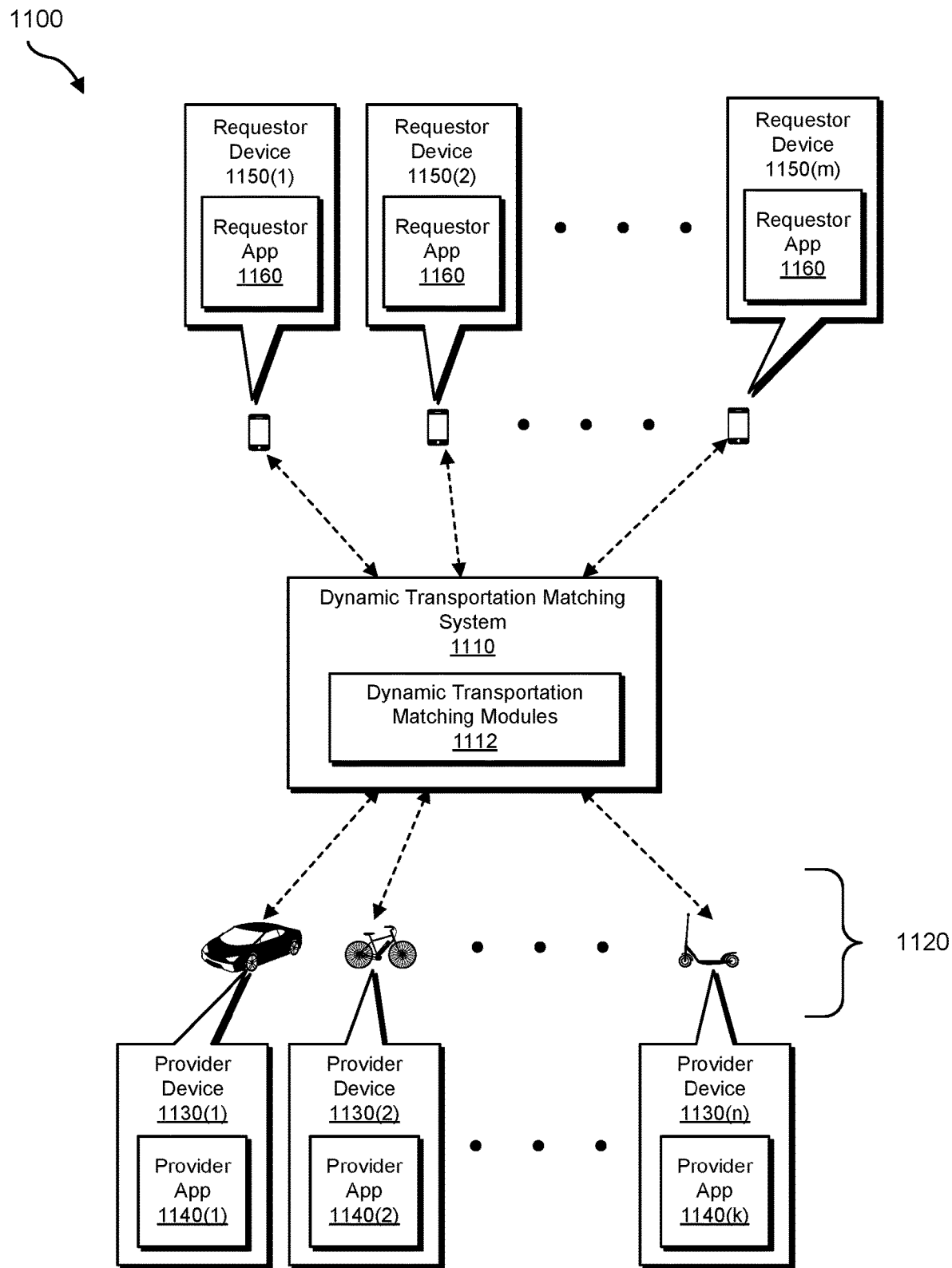
FIG. 11 is a block diagram of an example system for a dynamic transportation network that includes personal mobility vehicles.

FIG. 11 illustrates an example system 1100 for matching transportation requests with a dynamic transportation network that includes personal mobility vehicles. As shown in FIG. 11, a dynamic transportation matching system 1110 may be configured with one or more dynamic transportation matching modules 1112 that may perform one or more of the steps described herein. Dynamic transportation matching system 1110 may represent any computing system and/or set of computing systems capable of matching transportation requests. Dynamic transportation matching system 1110 may be in communication with computing devices in each of a group of vehicles 1120. Vehicles 1120 may represent any vehicles that may fulfill transportation requests. In some examples, vehicles 1120 may include disparate vehicle types and/or models. For example, vehicles 1120 may include road-going vehicles and personal mobility vehicles. In some examples, some of vehicles 1120 may be standard commercially available vehicles. According to some examples, some of vehicles 1120 may be owned by separate individuals (e.g., transportation providers). Furthermore, while, in some examples, many or all of vehicles 1120 may be human-operated, in some examples many of vehicles 1120 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 11 does not specify the number of vehicles 1120, it may be readily appreciated that the systems described herein are applicable to hundreds of vehicles, thousands of vehicles, or more. In one example, dynamic transportation matching system 1110 may coordinate transportation matchings within a single region for 50,000 vehicles or more on a given day. In some examples, vehicles 1120 may collectively form a dynamic transportation network that may provide transportation supply on an on-demand basis to transportation requestors.

As mentioned above, dynamic transportation matching system 1110 may communicate with computing devices in each of vehicles 1120. The computing devices may be any suitable type of computing device. In some examples, one or more of the computing devices may be integrated into the respective vehicles 1120. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1110.

As shown in FIG. 11, vehicles 1120 may include provider devices 1130(1)-(n) (e.g., whether integrated into the vehicle, permanently affixed to the vehicle, temporarily affixed to the vehicle, worn by a driver of the vehicle, etc.). In some examples, provider devices 1130 may include a provider apps 1140(1)-(k). Provider apps 1140(1)-(k) may represent any application, program, and/or module that may provide one or more services related to operating a vehicle and/or providing transportation matching services. For example, provider apps 1140(1)-(k) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 1140(1)-(k) may match the user of provider apps 1140(1)-(k) (e.g., a transportation provider) with transportation requestors through communication with dynamic transportation matching system 1110. In addition, and as is described in greater detail below, provider apps 1140(1)-(k) may provide dynamic transportation management system 1110 with information about a provider (including, e.g., the current location of the provider and/or vehicle) to enable dynamic transportation management system 1110 to provide dynamic transportation matching and/or management services for the provider and one or more requestors. In some examples, provider apps 1140(1)-(k) may coordinate communications and/or a payment between a requestor and a provider. According to some embodiments, provider apps 1140(1)-(k) may provide a map service, a navigation service, a traffic notification service, and/or a geolocation service.

Additionally, as shown in FIG. 11, dynamic transportation matching system 1110 may communicate with requestor devices 1150(1)-(m). In some examples, requestor devices 1150 may include a requestor app 1160. Requestor app 1160 may represent any application, program, and/or module that may provide one or more services related to requesting transportation matching services. For example, requestor app 1160 may include a transportation matching application for requestors. In some examples, requestor app 1160 may match the user of requestor app 1160 (e.g., a transportation requestor) with transportation providers through communication with dynamic transportation matching system 1110. In addition, and as is described in greater detail below, requestor app 1160 may provide dynamic transportation management system 1110 with information about a requestor (including, e.g., the current location of the requestor) to enable dynamic transportation management system 1110 to provide dynamic transportation matching services for the requestor and one or more providers. In some examples, requestor app 1160 may coordinate communications and/or a payment between a requestor and a provider. According to some embodiments, requestor app 1160 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 12:
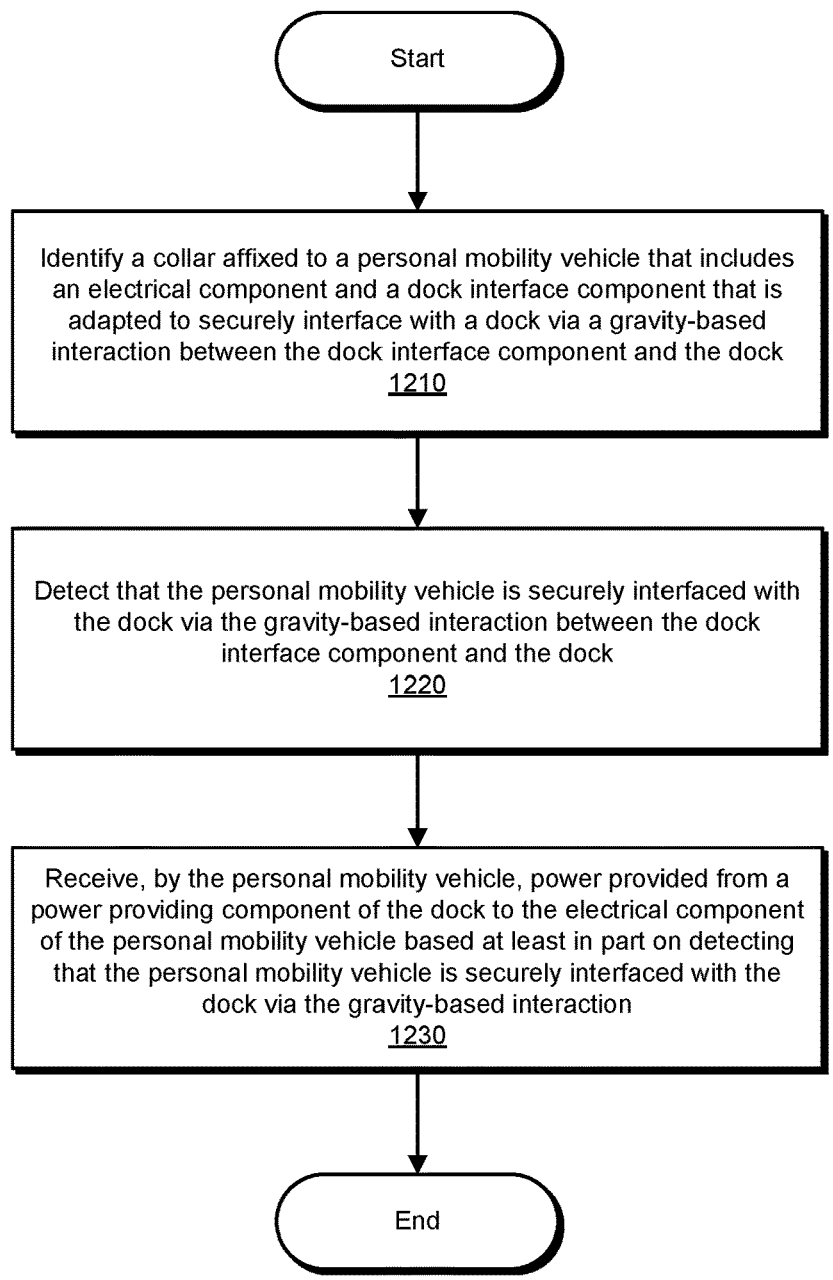
FIG. 12 is a flow diagram of an example method for charging a personal mobility vehicle via a dock.

FIG. 12 illustrates an example method 1200 for charging a PMV via a dock. As illustrated in FIG. 12, at step 1210, one or more of the systems described herein may identify a collar affixed to a personal mobility vehicle that includes an electrical component and a dock interface component that is adapted to securely interface with a dock via a gravity-based interaction between the dock interface component and the dock. At step 1220, one or more of the systems described herein may detect that the personal mobility vehicle is securely interfaced with the dock via the gravity-based interaction between the dock interface component and the dock. At step 1230, one or more of the systems described herein may receive, by the personal mobility vehicle, power provided from a power providing component of the dock to the electrical component of the personal mobility vehicle based at least in part on detecting that the personal mobility vehicle is securely interfaced with the dock via the gravity-based interaction.

In some embodiments, the systems described herein may send, from the personal mobility vehicle to the dock, a message that includes an identifier of the personal mobility vehicle. In some examples, the dock may receive the message that includes the identifier of the personal mobility vehicle and may determine, based at least in part on the identifier, that the personal mobility vehicle is approved to receive power from the dock. In some examples, the dock may decline to provide power to a personal mobility vehicle that does not send a valid identifier (e.g., an identifier on a white list of identifiers, that follows an expected format for identifiers, and/or that is not on a blacklist of identifiers) to the dock. In one embodiment, the collar may communicate with the dock via the same connection and/or port that the collar uses to receive charge from the dock. For example, the collar and dock may communicate via power line communication. In some embodiments, the collar may include a printed circuit board that facilitates the communication. Additionally or alternatively, the collar may include one or more pads adapted to make contact with a specified contact on the dock, such as a ball-shaped contact that is connected to a magnetic sensor within the dock. In some embodiments, when the pads initiate contact with the contact in the dock, the magnetic sensor may initiate a scan to detect a magnet in the collar. In some examples, once the dock detects the magnet, the dock may begin sending power (e.g., electrical charge) to the PMV via the collar. In one example, the sensor may detect when the magnet is no longer present and the dock may, in response to the sensor detecting the absence of the magnet, cease sending power. In some examples, the magnetic sensor may serve as a power conservation and/or safety mechanism.

Figure 13:
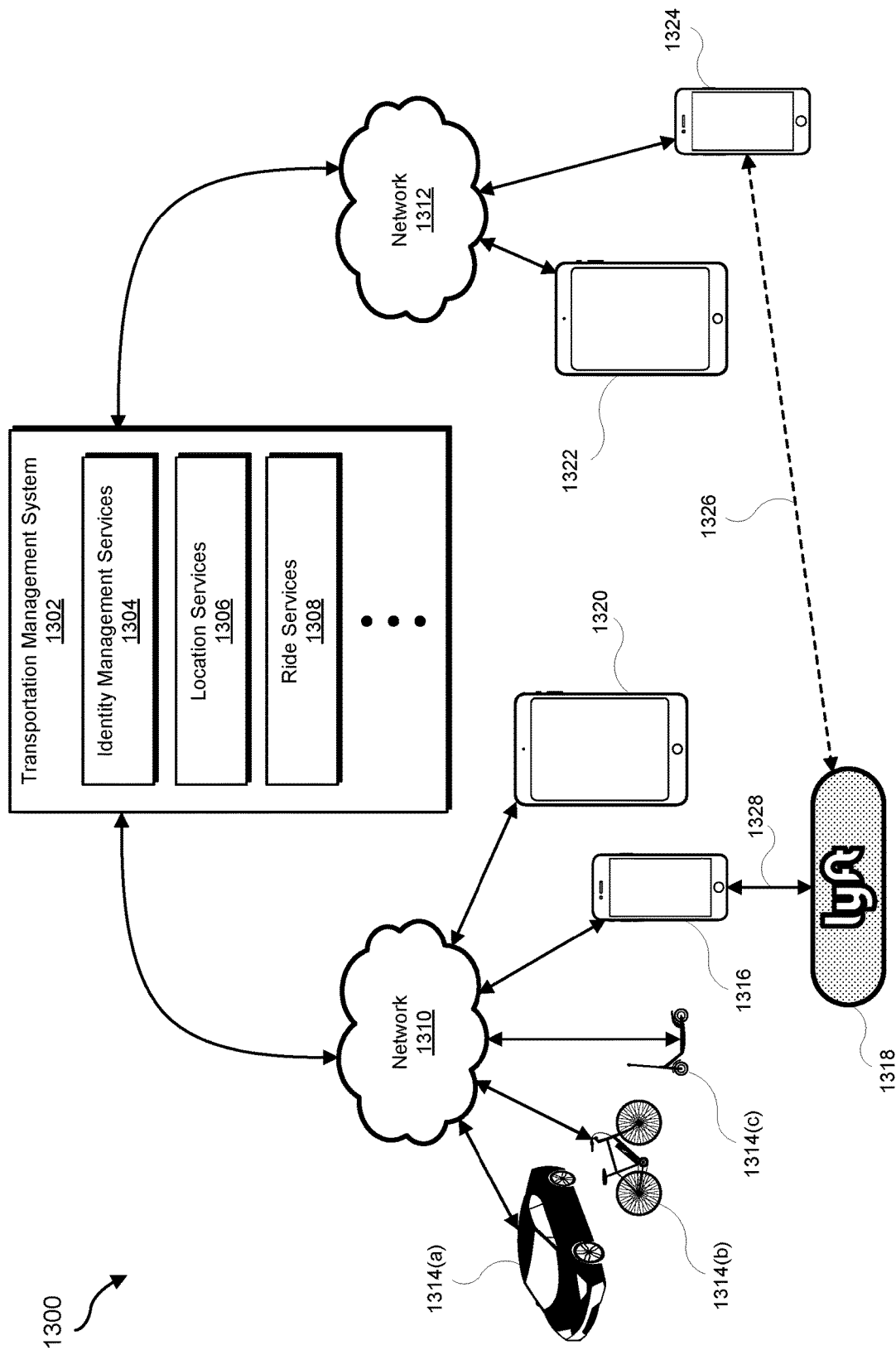
FIG. 13 is an illustration of an example requestor/provider management environment.

FIG. 13 shows a transportation management environment 1300, in accordance with various embodiments. As shown in FIG. 13, a transportation management system 1302 may run one or more services and/or software applications, including identity management services 1304, location services 1306, ride services 1308, and/or other services. Although FIG. 13 shows a certain number of services provided by transportation management system 1302, more or fewer services may be provided in various implementations. In addition, although FIG. 13 shows these services as being provided by transportation management system 1302, all or a portion of any of the services may be processed in a distributed fashion. For example, computations associated with a service task may be performed by a combination of transportation management system 1302 (including any number of servers, databases, etc.), one or more devices associated with a provider (e.g., devices integrated with managed vehicles 1314(a), 1314(b), and/or 1314(c); provider computing devices 1316 and tablets 1320; and transportation management vehicle devices 1318), and/or more or more devices associated with a ride requestor (e.g., the requestor's computing devices 1324 and tablets 1322). In some embodiments, transportation management system 1302 may include one or more general purpose computers, server computers, clustered computing systems, cloud-based computing systems, and/or any other computing systems or arrangements of computing systems. Transportation management system 1302 may be configured to run any or all of the services and/or software components described herein. In some embodiments, the transportation management system 1302 may include an appropriate operating system and/or various server applications, such as web servers capable of handling hypertext transport protocol (HTTP) requests, file transfer protocol (FTP) servers, database servers, etc.

In some embodiments, identity management services 1304 may be configured to perform authorization services for requestors and providers and/or manage their interactions and/or data with transportation management system 1302. This may include, e.g., authenticating the identity of providers and determining that they are authorized to provide services through transportation management system 1302. Similarly, requestors' identities may be authenticated to determine whether they are authorized to receive the requested services through transportation management system 1302. Identity management services 1304 may also manage and/or control access to provider and/or requestor data maintained by transportation management system 1302, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1302 may also manage and/or control access to provider and/or requestor data stored with and/or obtained from third-party systems. For example, a requester or provider may grant transportation management system 1302 access to a third-party email, calendar, or task management system (e.g., via the user's credentials). As another example, a requestor or provider may grant, through a mobile device (e.g., 1316, 1320, 1322, or 1324), a transportation application associated with transportation management system 1302 access to data provided by other applications installed on the mobile device. In some examples, such data may be processed on the client and/or uploaded to transportation management system 1302 for processing.

In some embodiments, transportation management system 1302 may provide ride services 1308, which may include ride matching and/or management services to connect a requestor to a provider. For example, after identity management services module 1304 has authenticated the identity a ride requestor, ride services module 1308 may attempt to match the requestor with one or more ride providers. In some embodiments, ride services module 1308 may identify an appropriate provider using location data obtained from location services module 1306. Ride services module 1308 may use the location data to identify providers who are geographically close to the requestor (e.g., within a certain threshold distance or travel time) and/or who are otherwise a good match with the requestor. Ride services module 1308 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1308 may use rule-based algorithms and/or machine-learning models for matching requestors and providers.

Transportation management system 1302 may communicatively connect to various devices through networks 1310 and/or 1312. Networks 1310 and 1312 may include any combination of interconnected networks configured to send and/or receive data communications using various communication protocols and transmission technologies. In some embodiments, networks 1310 and/or 1312 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1310 and/or 1312 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 1102.12 family of standards, Bluetooth, Bluetooth Low Energy, Near Field Communication (NFC), Z-Wave, and ZigBee). In various embodiments, networks 1310 and/or 1312 may include any combination of networks described herein or any other type of network capable of facilitating communication across networks 1310 and/or 1312.

In some embodiments, transportation management vehicle device 1318 may include a provider communication device configured to communicate with users, such as drivers, passengers, pedestrians, and/or other users. In some embodiments, transportation management vehicle device 1318 may communicate directly with transportation management system 1302 or through another provider computing device, such as provider computing device 1316. In some embodiments, a requestor computing device (e.g., device 1324) may communicate via a connection 1326 directly with transportation management vehicle device 1318 via a communication channel and/or connection, such as a peer-to-peer connection, Bluetooth connection, NFC connection, ad hoc wireless network, and/or any other communication channel or connection. Although FIG. 13 shows particular devices communicating with transportation management system 1302 over networks 1310 and 1312, in various embodiments, transportation management system 1302 may expose an interface, such as an application programming interface (API) or service provider interface (SPI) to enable various third parties which may serve as an intermediary between end users and transportation management system 1302.

In some embodiments, devices within a vehicle may be interconnected. For example, any combination of the following may be communicatively connected: vehicle 1314, provider computing device 1316, provider tablet 1320, transportation management vehicle device 1318, requestor computing device 1324, requestor tablet 1322, and any other device (e.g., smart watch, smart tags, etc.). For example, transportation management vehicle device 1318 may be communicatively connected to provider computing device 1316 and/or requestor computing device 1324. Transportation management vehicle device 1318 may establish communicative connections, such as connections 1326 and 1328, to those devices via any suitable communication technology, including, e.g., WLAN technologies implementing the IEEE 1102.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1302 using applications executing on their respective computing devices (e.g., 1316, 1318, 1320, and/or a computing device integrated within vehicle 1314), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1314 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1302. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 14:
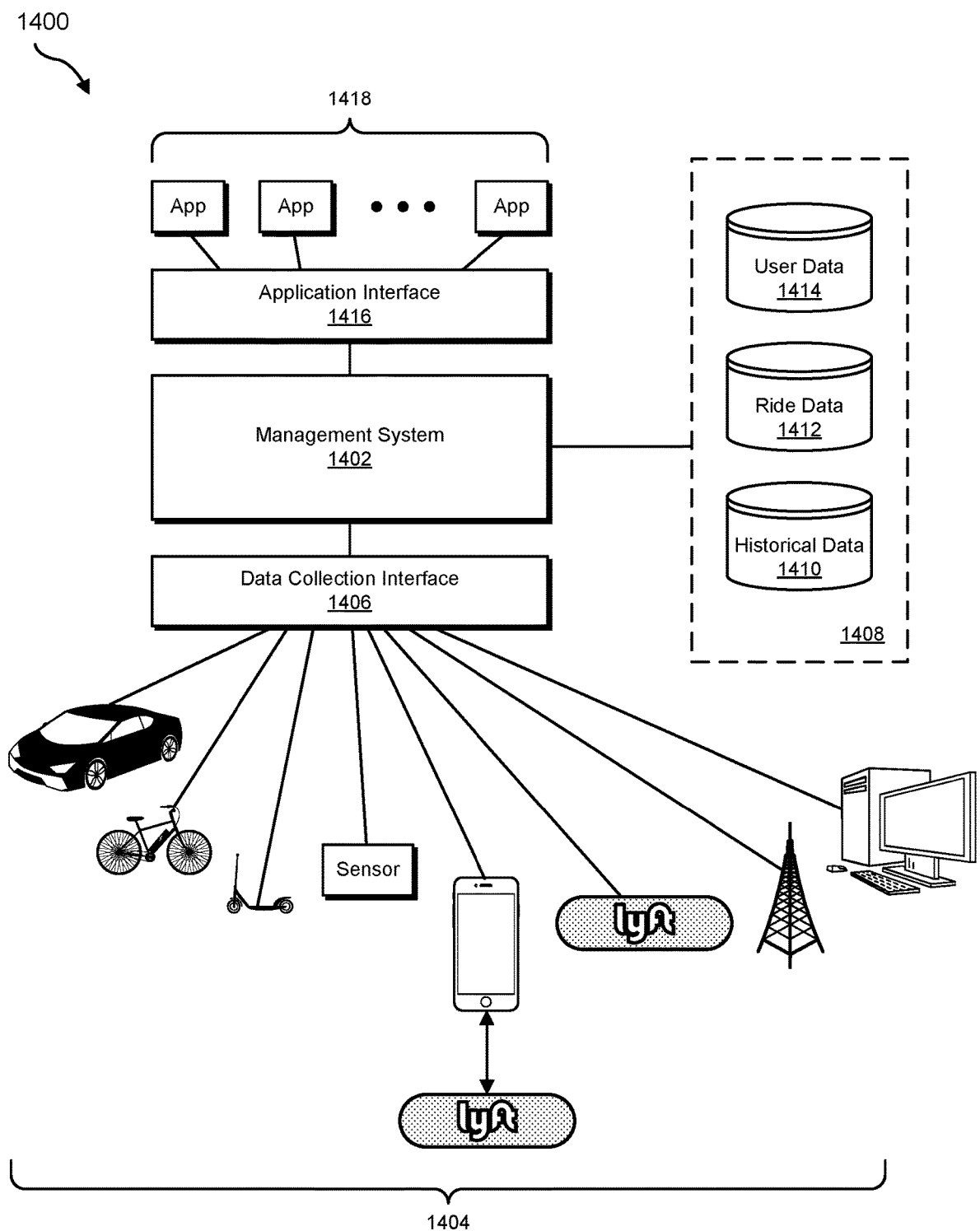
FIG. 14 is an illustration of an example data collection and application management system.

FIG. 14 shows a data collection and application management environment 1400, in accordance with various embodiments. As shown in FIG. 14, management system 1402 may be configured to collect data from various data collection devices 1404 through a data collection interface 1406. As discussed above, management system 1402 may include one or more computers and/or servers or any combination thereof. Data collection devices 1404 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1406 can include, e.g., an extensible device framework configured to support interfaces for each data collection device. In various embodiments, data collection interface 1406 may be extended to support new data collection devices as they are released and/or to update existing interfaces to support changes to existing data collection devices. In various embodiments, data collection devices may communicate with data collection interface 1406 over one or more networks. The networks may include any network or communication protocol as would be recognized by one of ordinary skill in the art, including those networks discussed above.

As shown in FIG. 14, data received from data collection devices 1404 can be stored in data store 1408. Data store 1408 may include one or more data stores, such as databases, object storage systems and services, cloud-based storage services, and other data stores. For example, various data stores may be implemented on a non-transitory storage medium accessible to management system 1402, such as historical data store 1410, ride data store 1412, and user data store 1414. Data stores 1408 can be local to management system 1402, or remote and accessible over a network, such as those networks discussed above or a storage-area network or other networked storage system. In various embodiments, historical data 1410 may include historical traffic data, weather data, request data, road condition data, or any other data for a given region or regions received from various data collection devices. Ride data 1412 may include route data, request data, timing data, and other ride related data, in aggregate and/or by requestor or provider. User data 1414 may include user account data, preferences, location history, and other user-specific data. Although certain data stores are shown by way of example, any data collected and/or stored according to the various embodiments described herein may be stored in data stores 1408.

As shown in FIG. 14, an application interface 1416 can be provided by management system 1402 to enable various apps 1418 to access data and/or services available through management system 1402. Apps 1418 may run on various user devices (including provider and requestor computing devices, such as those discussed above) and/or may include cloud-based or other distributed apps configured to run across various devices (e.g., computers, servers, or combinations thereof). Apps 1418 may include, e.g., aggregation and/or reporting apps which may utilize data 1408 to provide various services (e.g., third-party ride request and management apps). In various embodiments, application interface 1416 can include an API and/or SPI enabling third party development of apps 1418. In some embodiments, application interface 1416 may include a web interface, enabling web-based access to data 1408 and/or services provided by management system 1402. In various embodiments, apps 1418 may run on devices configured to communicate with application interface 1416 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a mount component that is mountable to a structural component of a personal mobility vehicle, wherein the mount component is mountable to any of at least one type of bicycle at a first position and at least one type of scooter at a second position, and wherein a docking point of a dock is configured to be interfaceable with any of the at least one type of bike at the first position and the at least one type of scooter at the second position;
a dock interface component that is adapted to securely interface with the dock via a gravity-based interaction between the dock interface component and the dock, wherein the dock comprises a communication component that is configured to send one or more messages regarding the personal mobility vehicle to a server managing a fleet of different types of vehicles including the personal mobility vehicle, and wherein the communication component of the dock is further configured to receive instructions from the server based on the one or more messages sent by the dock; and
an electrical component of the dock interface component configured to receive power from a charging component on the dock that is connected to a power source, wherein the electrical component receives the power based on the gravity-based interaction securely interfacing the dock interface component with the dock.

2. The apparatus of claim 1, wherein the gravity-based interaction comprises a secure temporary physical connection caused by gravity pulling a notch of the dock interface component onto a protrusion of the dock such that the notch interlocks with the protrusion.

3. The apparatus of claim 1, wherein:
the structural component of the personal mobility vehicle comprises a handlebar stem of a scooter; and
the mount component is mounted to the handlebar stem of the scooter such that, when the scooter is upright, the dock interface component is at a height compatible with a collar interface component of the dock.

4. The apparatus of claim 1, wherein the mount component comprises the dock interface component.

5. The apparatus of claim 1, wherein the dock interface component is shaped to define a notch into which a protrusion of the dock is inserted when the dock interface component is securely interfaced with the dock.

6. The apparatus of claim 5, wherein the notch of the dock interface component fits a ramp of the dock such that the notch of the dock interface component first slides up the ramp and then rests on the protrusion via the gravity-based interaction.

7. The apparatus of claim 1, wherein the dock interface component remains in the same static arrangement when securely interfaced with the dock and when not interfaced with the dock.

8. The apparatus of claim 1, further comprising a vehicle communication module that is located within the electrical component and that communicates with the communication component of the dock when the dock interface component is securely interfaced with the dock.

9. The apparatus of claim 1, wherein the electrical component both receives the power from the power source associated with the dock and communicates with the communication component of the dock via a same port.

10. The apparatus of claim 8, wherein the vehicle communication module sends information about a status of the personal mobility vehicle to the dock.

11. A system comprising:
a dock that comprises:
a vehicle interface component;
a power providing component; and
a communication component that is configured to send one or more messages regarding a personal mobility vehicle to a server managing a fleet of different types of vehicles including the personal mobility vehicle, wherein the communication component of the dock is further configured to receive instructions from the server based on the one or more messages sent by the dock; and
a personal mobility vehicle collar that comprises:
a mount component that is mountable to a structural component of the personal mobility vehicle, wherein the mount component is mountable to any of at least one type of bicycle at a first position and at least one type of scooter at a second position, and wherein a docking point of the dock is configured to be interfaceable with any of the at least one type of bike at the first position and the at least one type of scooter at the second position;
a dock interface component that is adapted to securely interface with the dock via a gravity-based interaction between the dock interface component and the vehicle interface component of the dock; and
an electrical component of the dock interface component configured to receive power from the power providing component of the dock, wherein the electrical component receives the power based on the gravity-based interaction securely interfacing the dock interface component with the dock.

12. The system of claim 11, wherein the vehicle interface component of the dock comprises a ramp that guides the electrical component into secure contact with the power providing component.

13. The system of claim 12, wherein the ramp comprises an upward slope towards the power providing component.

14. The system of claim 11, wherein the power providing component of the dock comprises at least one pin that interfaces with the electrical component of the personal mobility vehicle collar when the dock interface component is securely interfaced with the dock.

15. The system of claim 11, wherein the vehicle interface component of the dock remains in the same static arrangement when securely interfaced with the dock interface component of the personal mobility vehicle collar as when not interfaced with the dock interface component of the personal mobility vehicle collar.

16. The system of claim 11, wherein the dock comprises at least one guide component that guides the dock interface component of the personal mobility vehicle collar into the vehicle interface component of the dock at an angle that enables the dock interface component to securely interface with the vehicle interface component.

17. A computer-implemented method comprising:
identifying a collar affixed to a personal mobility vehicle, the collar comprising an electrical component and a dock interface component that is adapted to securely interface with a dock via a gravity-based interaction between the dock interface component and the dock, wherein the dock comprises a communication component that is configured to send one or more messages regarding the personal mobility vehicle to a server managing a fleet of different types of vehicles including the personal mobility vehicle, wherein the communication component of the dock is further configured to receive instructions from the server based on the one or more messages sent by the dock, and wherein the collar further comprises a mount component that is mountable to a structural component of the personal mobility vehicle, wherein the mount component is mountable to any of at least one type of bicycle at a first position and at least one type of scooter at a second position, and wherein a docking point of the dock is configured to be interfaceable with any of the at least one type of bike at the first position and the at least one type of scooter at the second position;

detecting that the personal mobility vehicle is securely interfaced with the dock via the gravity-based interaction between the dock interface component and the dock; and receiving, by the personal mobility vehicle, power provided from a power providing component of the dock to the electrical component of the collar based at least in part on detecting that the personal mobility vehicle is securely interfaced with the dock via the gravity-based interaction.

18. The computer-implemented method of claim 17, further comprising sending, from the personal mobility vehicle to the dock, a message comprising an identifier of the personal mobility vehicle.

19. The computer-implemented method of claim 18, wherein the power providing component of the dock provides the power based at least in part on:

receiving, by the dock, the message comprising the identifier of the personal mobility vehicle; and determining, by the dock, based at least in part on the identifier, that the personal mobility vehicle is approved to receive power from the dock.

\* \* \* \* \*